Jan. 23, 1951     J. THOMSON     2,538,951
CONVEYER OF ENDLESS BELT TYPE
Filed Oct. 22, 1947
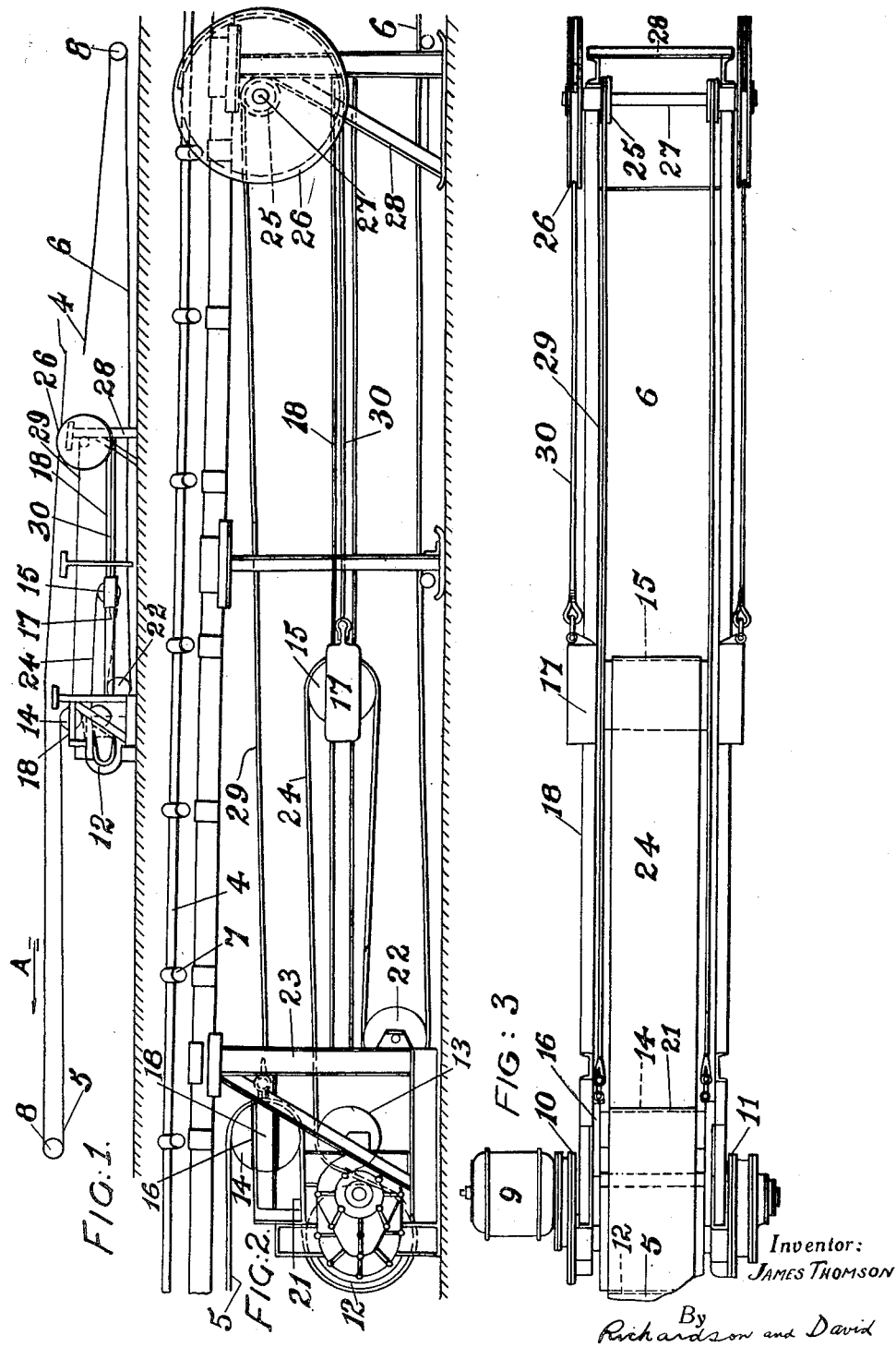
Inventor:
JAMES THOMSON
By Richardson and David
Attorneys Patented Jan. 23, 1951

2,538,951

UNITED STATES PATENT OFFICE 2,538,951

CONVEYER OF ENDLESS BELT TYPE

James Thomson, Glasgow, Scotland, assignor to Mavor & Coulson, Limited, Glasgow, Scotland Application October 22, 1947, Serial No. 781,392
In Great Britain October 12, 1945

Section 1, Public Law 690, August 8, 1946
Patent expires October 12, 1965

9 Claims. (Cl. 198—208)

1

This invention refers to conveyors of endless belt type, in which problems arise in maintaining the tension of the so-called "slack" stretch of the return run in relation to the full tension of the conveying run of the belt under load.

An object of this invention is to make provision whereby the full tension in a deflected portion of the endless belt going into the driving gear is caused to maintain a tensioning deflection in the form of a loop in the return run going out from the driving gear, the arrangement to be such that the first deflection varies with increase or decrease of the load imposed by the conveyor on the driving gear and therefore of the tension on the conveying run of the belt and such variation automatically causes a corresponding but amplified increase or decrease in the tensioning deflection.

Another object is to arrange that not only the deflected outgoing portion but also the deflected ingoing portion has the form of a loop, there being accordingly one loop on each side of the driving gear and both connected by motion-multiplying gear so that shortening of the ingoing loop under increased belt pull automatically causes lengthening of the outgoing loop to an amplified degree.

Another object is to have a belt-deflecting drum applied to the ingoing stretch of the return run, a belt-deflecting drum forming a loop in the outgoing stretch, said drums to be each movable to increase or decrease the degree of deflection formed by it in the belt, and means to connect said drums and yieldingly hold them against movement due to the tension of the deflected stretches, said means to incorporate motion-multiplying gear such that a movement of the drum applied to the one stretch will automatically produce a greater and opposite movement of the drum applied to the other stretch.

The invention will now be described by way of example with reference to the accompanying drawing, in which:

Fig. 1 is a diagrammatic elevation of an endless belt conveyor embodying the invention. Fig. 2 is an elevation to a larger scale than Fig. 1 of the driving gear and associated parts. Fig. 3 is a plan corresponding to Fig. 2 but showing only the lower run of the conveyor.

Referring to the drawing, the endless conveyor belt is arranged in two runs, namely an upper run 4 and a lower run comprising a tensioned stretch 5 and a so-called "slack" stretch 6, between which two stretches the driving gear operates. In the example shown the upper run 4 is the conveying run and conveys from right to

2 left (in the direction of the arrow A, Fig. 1); and the lower run 5, 6 is the return run. The upper run 4 is as usual of trough form in cross-section, being supported by so-called troughing rollers 7 (shown only in Fig. 2). At opposite ends of the conveyor structure the belt passes around end rollers 8. The driving gear as usual comprises an electric motor 9, gearing (not shown) working in casings 10 and 11 (Fig. 3) and a driving drum 12 wrapped by the lower run of the belt. A guide roller 13 leads the belt appropriately from the drum 12, the stretch 5 travelling into the driving gear and the stretch 6 travelling out from the gear. The driving gear is located at an intermediate portion in the lower run 5, 6 of the belt.

Parts provided for the purpose of the invention include two loop-forming drums 14 and 15 each journalled in one of two bearing blocks 16 and 17 respectively slidable along guide bars 18 incorporated in the stationary structure of the conveyor. The drum 14 forms the tensioned stretch 5 of the return run into an approximately horizontal loop 21. Correspondingly the drum 15, with the aid of a guide drum 22 journalled in a stationary location on framework 23, forms the slack stretch 6 of the return run into an approximately horizontal loop 24.

The parts provided for the purposes of the invention also include a differential rope pulley assembly, comprising two small diameter pulleys 25 and two large diameter pulleys 26 all secured to a cross shaft 27 journalled in a stationary location on framework 28. A pair of side ropes 29 are connected each at one end to the bearing block 16 and at the other end to the small diameter pulleys 25. Correspondingly, another pair of side ropes 30 are connected each at one end to the bearing block 17 and at the other end to the large diameter pulleys 26. The ropes 29 are wound on their pulleys 25 oppositely to the ropes 30 on their pulleys 26.

In use of the conveyor, the load on its conveying run 4 affects the tension of the belt, including the ingoing stretch 5 of the return run. That is to say, any increase in the load will tend to increase the tension in the stretch 5. However, if the tension in the stretch 5 increases, the loop 21 will become shortened and will pull the drum 14 and its block 16 towards the left; and the ropes 29 will force the pulley assembly 25, 26 to turn counter-clockwise (as viewed in Fig. 2). Thus, the ropes 30 from the pulleys 26 will pull the bearing block 17 and its drum 15 so as to lengthen the loop 24 and take up slack in the outgoing stretch 6 of the lower run. By virtue of the motion-multiplying action of the differential pulley assembly 25, 26, the loop 24 lengthens to an over-compensating extent, that is to say an extent greater than the loop 21 shortens, so that the drums 14 and 15 forming these loops tend to maintain a position of equilibrium; and a degree of tension appropriate to the load is maintained in the conveyor belt 4, 5, 6.

It will be obvious that the motion-multiplying gear 25, 26 not only increases the length of the pull which said gear transmits from the ropes 29 to the ropes 30 but proportionately decreases the force of the pull which said gear transmits. Thus, the loop 24 formed in the lower run of the belt is subjected by the tensioning drum 15 to a load that is substantially less than the load imposed by the loop 21 on the loop-forming drum 14.

Seeing that the conveyor must be capable of starting at a time when the conveying run 4 is either loaded or unloaded, it is desirable in regard to any horizontal conveyor according to the invention that provision should be made for applying light tension to the belt independently of the means controlling the loops 21 and 24. Such provision may take the form of any usual belt-tensioning device for adjusting, say, one of the terminal rollers 8.

I claim:

1. A conveyor comprising an endless belt, driving gear operating on the belt, a stretch of said belt subject to the tension of the conveying run going into the gear and another stretch of said belt subject to the lesser tension of the return run going out from the gear, a belt-deflecting drum applied to the ingoing stretch and movable in response to variations in the tension of the conveying run, a belt tensioning drum applied to the outgoing stretch and deflecting it into the form of a loop, said drums being each movable to vary the degree of deflection formed by it in the belt, and means connecting said drums, said means incorporating motion-multiplying gear such that a movement of the drum applied to the ingoing stretch due to variation in the load imposed by the conveyor on the driving gear produces a greater and oppositely effective movement of the drum applied to the outgoing stretch.

2. A conveyor as claimed by claim 1 in which the motion-multiplying gear is a differential pulley assembly comprising small diameter and large diameter pulleys having connections from said drums attached to said pulleys respectively in opposite directions.

3. A conveyor as claimed by claim 2 in which the small diameter and large diameter pulleys are respectively connected to the belt-deflecting drums applied to the ingoing and outgoing stretches of the belt.

4. A conveyor as claimed by claim 1 comprising also bearing blocks in which the belt-deflecting drums are journalled, guide bars along which the bearing blocks are slidable to and from one another, and other drums co-operating with the belt-deflecting drums to form the belt into loops.

5. A conveyor comprising an endless belt formed into a conveying run and a return run, driving gear operating on the return run, a stretch of the return run going into the gear and another stretch of the return run going out from the gear, a belt-looping drum applied to the ingoing stretch, a belt-looping drum applied to the outgoing stretch, bearing blocks in which said drums are respectively journalled, said blocks being each movable under the influence of the tension applied to its drum by the looped stretch thereon in order to vary the length of the loop, and multiplying gear connecting said blocks so that a movement due to variation in load of the block whose drum is applied to the ingoing stretch produces a greater movement of opposite effect in the block whose drum is applied to the other stretch.

6. A conveyor as claimed by claim 5 in which the motion-multiplying gear consists of a small diameter pulley connected to the bearing block of the belt-looping drum applied to the ingoing stretch and a large diameter pulley connected to the other bearing block, said pulleys being interconnected to form a single rotatable assembly.

7. A conveyor comprising an endless belt, driving gear operating on said belt, a full-tensioned stretch thereof going into said gear and a lower-tensioned stretch thereof going out from said gear, a first movable member applied to said ingoing stretch to loop a portion of it, a second movable member applied to said outgoing stretch to loop a portion of it, motion-multiplying means connecting said members and adapted to transmit to the second member from the first member, on movement thereof due to increase or decrease in the load imposed by the conveyor on the driving gear through said ingoing stretch, an over-compensating movement directed to increase or decrease the tension in the outgoing stretch and thus maintain the tension relationship between both of said stretches.

8. A conveyor comprising an endless belt with a conveying run and a return run, driving gear operating on said return run, a stretch thereof going into said gear and another stretch thereof going out from said gear, a first drum applied to said ingoing stretch to form a loop in a portion of it, a second drum applied to said outgoing stretch to form a loop in a portion of it, movable bearings in which said drums are respectively mounted, motion-multiplying gear, and means connecting said bearings to said gear, said connecting means and gear being adapted to transmit to the bearing of the second drum from the bearing of the first drum, on movement thereof due to increase or decrease in the load imposed by the conveyor on the driving gear through said ingoing stretch, an over-compensating movement directed to increase or decrease the tension in the outgoing stretch and thus maintain the tension relationship between both of said stretches.

9. A conveyor as claimed by claim 8 in which the motion-multiplying gear consists of an assembly of interconnected small and large pulleys rotatable as a unit, the small pulley being connected to the bearing of the first drum and the large pulley being connected to the other bearing.

JAMES THOMSON.

REFERENCES CITED

The following references are of record in the file of this patent:

UNITED STATES PATENTS

| Number | Name | Date |
|---|---|---|
| 417,512 | Rosquist | Dec. 17, 1889 |
| 1,540,720 | Buckbee | June 2, 1925 |
| 2,202,882 | Wylie | June 4, 1940 |